United States Patent [19]

Marraccini et al.

[11] Patent Number: 4,655,843

[45] Date of Patent: Apr. 7, 1987

[54] SILANE DIIMIDIC TETRACARBOXYLIC PERYLENE DYES AND COMPOSITE PIGMENTS

[75] Inventors: Antonio Marraccini; Filippo M. Carlini; Giorgio Bottaccio; Antonio Pasquale; Giorgio Maranzana, all of Novara, Italy

[73] Assignee: Montedison S.p.A., Milan, Italy

[21] Appl. No.: 839,031

[22] Filed: Mar. 12, 1986

Related U.S. Application Data

[62] Division of Ser. No. 663,166, Oct. 22, 1984, Pat. No. 4,613,667.

[30] Foreign Application Priority Data

Oct. 28, 1983 [IT] Italy .............................. 23501 A/83

[51] Int. Cl.$^4$ .............................................. C09C 3/08
[52] U.S. Cl. ............................. 106/308 B; 106/308 Q
[58] Field of Search ............... 546/14, 37; 106/308 B, 106/308 Q

[56] References Cited

U.S. PATENT DOCUMENTS 4,381,886  5/1983  Yokokura et al. .................. 350/341

OTHER PUBLICATIONS

Derwent Abstract Accession No. 83-830163/48, Japanese Patent J58181049, Oct. 22, 1983.

*Primary Examiner*—Amelia B. Yarbrough
*Attorney, Agent, or Firm*—Stevens, Davis, Miller & Mosher

[57] ABSTRACT

Silane diimidic tetracarboxylic perylene dyes, the composite pigments obtainable therefrom by means of grafting onto an inorganic substrate, and the processes for preparing same.

The dyes have the general formula:

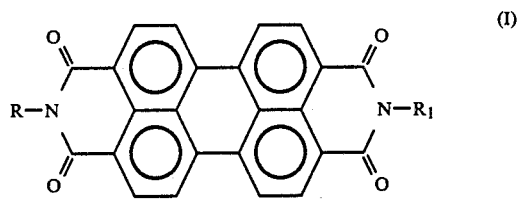

in which R is the residue of a silane group of formula:

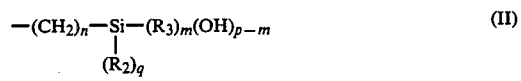

in which n is 3, 4 or 5; q is 0 or 1; p and m are such integers than when q is 0, p is 3 and m is 0, 1, 2 or 3, and when q is 1, p is 2 and m is 0, 1 or 2; $R_2$ is an alkyl $C_1$–$C_4$ or a phenyl; $R_3$ is an alkoxyl $C_1$–$C_2$; $R_1$ may be the same as R or represent an alkyl $C_1$–$C_6$, a cycloalkyl, a phenyl optionally substituted by one or more alkyl or alkoxyl groups $C_1$–$C_6$ or a halogen.

The dyes and the composite pigments obtained from said dyes are utilized in paints, air and stove enamels, in the pigmentation of plastic materials, and in printing inks.

6 Claims, No Drawings

SILANE DIIMIDIC TETRACARBOXYLIC PERYLENE DYES AND COMPOSITE PIGMENTS

This is a division of application Ser. No. 663,166 filed Oct. 22, 1984 now U.S. Pat No. 4,613,667.

DESCRIPTION

This invention relates to diimidic tetracarboxylic perylene dyes, briefly referred to as "perylene" dyes, containing chemically combined therewith at least one silane group, and to the corresponding silane composite pigments, preparable by association thereof with an inorganic solid substrate.

Whenever used in the following description, "silane composite pigment" means a pigmentary material consisting or consisting essentially of an association of perylene dyes containing at least one silane group, with an inorganic solid substrate or support.

The above association of the perylene dye containing at least one silane group or, briefly, silane perylene dye, with the solid substrate imparts to the silane perylene dye the pigmentary characteristics which are typical of the inorganic pigments.

Such association is obtained through the formation of chemical bonds (grafting) between the silane moiety of the dye and the inorganic substrate.

An object of the present invention is that of providing silane perylene dyes useful for preparing pigments endowed with excellent characteristics; in particular, highly hiding or fully transparent, and exhibiting excellent stabilities to solvents.

Further objects reside in the preparation of the above dyes and pigments by simple and economic methods.

These and still other objects, which will be apparent from the detailed description given hereinafter, are achieved by the silane perylene dyes and by the silane composite pigments derivable therefrom, by grafting onto the surface of an inorganic substrate, and by the processes for preparing them.

Thus, an object of the present invention is the perylene dyes containing at least one silane group of formula:

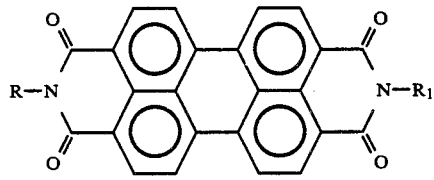

in which R is the residue of a silane group of formula:

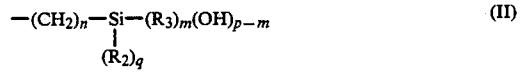

in which n is 3, 4 or 5; q is 0 or 1; p and m are such integers that when q is 0, p is 3 and m is 0, 1, 2 or 3, and when q is 1, p is 2 and m is 0, 1 or 2; $R_2$ is an alkyl having up to 4 carbon atoms or a phenyl; $R_3$ is an alkoxyl having up to 2 carbon atoms; $R_1$ may be like R or represent an alkyl having up to 6 carbon atoms, a cycloalkyl, a phenyl optionally substituted by one or more halogens or alkyl groups or alkoxyl groups containing up to 6 carbon atoms.

They are prepared by means of a process consisting or consisting essentially in reacting 3,4,9,10-perylenetetracarboxylic dianhydride of the formula:

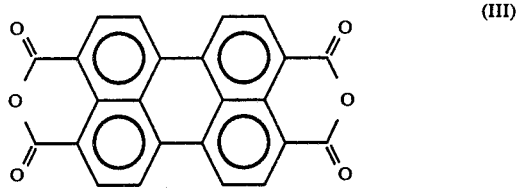

with a compound of formula:

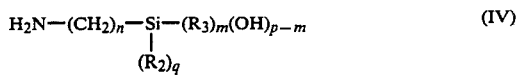

in which $R_2$, $R_3$, n, q, p and m are as defined above, and optionally with a compound of the formula:

wherein $R_4$ is an alkyl having up to 6 carbon atoms, a cycloalkyl or a phenyl optionally substituted by one or more alkyls, alkoxyls or halogens, in a reaction medium consisting or consisting essentially of water and/or organic solvents, at a temperature ranging from 130° to 240° C., during 6 to 24 hours.

When one wants to obtain a dye containing two silane groups, one uses a silane compound (IV): dianhydride (III) molar ratio of at least 2.

When one wants to obtain a dye containing only one silane group, one uses at least one mole of silane compound (IV) and at least one mole of amine (V) for each mole of dianhydride (III).

The reaction may be optionally carried out in the presence of a Zn salt, such as, e.g., zinc chloride and zinc acetate, in amounts varying from 1 to 50% by weight in respect to the dianhydride employed.

It is possible to operate in a water suspension, in mixtures of water and organic solvents miscible with water, or in organic solvents.

As water-miscible organic solvents there may be utilized, for example, dioxane, dimethylformamide, pyridine, and as water-immiscible solvents, for example, quinoline, trichlorobenzene, alpha-chloronaphthalene and nitrobenzene.

When using water or mixtures of water and organic solvents, the reaction is preferably carried out in a closed reactor, under an autogenous pressure, utilizing compound (V) in the form of hydrochloride. The product obtained from the reaction is usually hot-washed with alkaline, acid and neutral water, then with methanol, and finally dried at ambient temperature.

The perylene tetracarboxylic 3,4,9,10-dianhydride (III) is a known and commercially available product.

As silane compounds of formula (IV), those derived from amino-alkoxy-silanes, such as, for example, γ-aminopropyltriethoxysilane, δ-amino-butyl-triethoxysilane, δ-amino-butyl-phenyl-diethoxysilane, γ-aminopropyl-methyl-diethoxysilane, have proved particularly suitable. Said amino-alkoxy-silanes are known and commercially available compounds.

However, they may be prepared according to conventional techniques, for example, by reacting the corresponding chloroalkoxy-silanes with aliphatic amines.

As amines of formula (V) there may be employed, for instance, the linear aliphatic amines, such as methylamine, ethylamine, propylamine, butylamine, pentylamine, hexylamine, the corresponding branched chain amines, such as sec.butylamine, ter.butylamine and isopropylamine, the cycloalkyl amines, such as cyclohexylamine and morpholine, the aromatic amines, such as aniline, the ortho-, meta- or para-toluidines, anisidines or chloroanilines, the 2,4- or 3,5-xylidines, dianisidines or dichloroanilines, 2-methyl-4-chloroaniline, 2,5-dimethoxy-4-chloroaniline, 2,4-dimethoxy-5-chloroaniline.

The silane perylene dyes of formula (I) possess in themselves good pigmentary characteristics, such as good stability to solvents, and in applications in stove alkyd enamels or in the pigmentation of plastic materials; they provide products endowed with a high tinting strength, good general stabilities and pure shades.

The silane perylene dyes of formula (I), as they contain in their molecules silanol groups and/or alkoxyl groups hydrolyzable to silanol groups —Si(OH)$_3$, are capable of both self-condensing by reaction among the above-said silanol groups, and of chemically reacting with the surface hydroxyl groups of proper inorganic substrates which condense with those, with formation of a stable chemical bond (grafting) between the dye and the substrate, giving rise to a composite product having excellent pigmentary characteristics.

The above dyes are therefore most preferably used for preparing composite pigments—this being a further object of the present invention—consisting of the silane perylene dyes of formula (I) grafted on an inorganic support.

Particularly suitable for being utilized in the preparation of composite pigments are the silane dyes of formula:

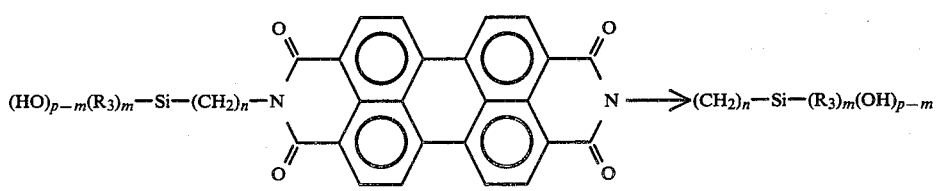

wherein n, m, p and R$_3$ have the meanings given above, as well as silane dyes of formula:

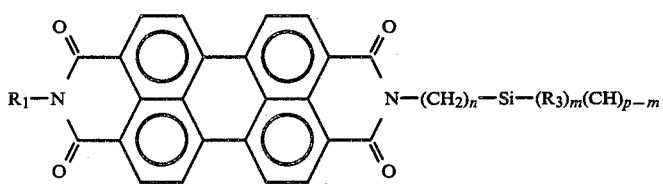

wherein R$_1$, different from R, n, m, p and R$_3$, have the meanings given above.

As inorganic substrates or supports which are particularly suited for ensuring the pigmentary nature of the silane perylene dyes of formula (I), the following are advantageously employed: TiO$_2$, in its gel, semicrystalline, rutile or anatase forms, also of the commercial type, in which there may be present surface coatings consisting of mixtures of one or more oxides selected from SiO$_2$, Al$_2$O$_3$, TiO$_2$; furthermore, there may be used mechanical mixtures of TiO$_2$ with SiO$_2$ and/or Al$_2$O$_3$, as well as SiO$_2$ and/or Al$_2$O$_3$, said supports being finely particled. The mixed substrates of TiO$_2$, SiO$_2$ and/or Al$_2$O$_3$ obtained by precipitation of SiO$_2$ and/or Al$_2$O$_3$, also as alumino-silicates, onto crystalline TiO$_2$ particles, according to conventional methods, are preferably due to their superior characteristics.

In relation to the uses, hiding degree or tinting strength to be obtained, the above-mentioned substrates may also be utilized in admixture with one another.

The specific surface of said substrates can vary over a wide range, from 5 to 500 m$^2$/g, and preferably from 10 to 200 m$^2$/g.

The composite pigments containing from 10 to 50% by weight of the silane perylene dye of formula (I) in grafted form are particularly preferred, owing to their superior characteristics.

The process for preparing the composite pigments composed of the silane perylene dyes (I) grafted on the above inorganic substrates consists or consists essentially in treating the selected substrate with the silane dye (I), in a reaction medium consisting or consisting essentially of water and/or inert organic solvents at a temperature ranging from 20° C. to the reflux temperature of the reaction medium, and then in separating the resulting product by filtration, in washing and then drying it.

Such treatment can be advantageously carried out by grinding the silane dyes with the substrate in said reaction medium. Such treatment may last from 2 to 12 hours, depending on the reaction temperature employed.

Particularly advantageous results are obtained if the composite pigment is subjected to a dry heat treatment in an oven for 4–8 hours at 80° to 140° C.

Suitable inert organic solvents are, for example, quinoline, dimethylformamide, N-methylpyrrolidone, dichloro- and trichloro-benzenes, dimethylsulphoxide and n-heptane.

The process of this invention has proved particularly suitable for obtaining intensely colored pigments having a high tinting strength, even in the presence of inorganic substrates having a low specific surface, such as, e.g., highly hiding TiO$_2$.

The composite pigments of the present invention may have a composition varying over a wide range, in relation to the nature, particle size, and specific surface of the substrate particles, and in relation to the tinting strength desired for the pigment.

The granulometric analysis of the composite pigment reveals that the organic moiety is prevailingly distributed on the surface of the inorganic substrate particles.

The X-ray diffractometric analysis indicates that the composite pigment particles exhibit the crystallinity which is typical of the substrate, while the grafted silane perylene coating proves to be of an amorphous nature.

The grafted silane perylene pigments of the present invention do not exhibit—thanks to their composite nature brought about by the chemical bonds between the silane organic component and the inorganic component—the defects which are typical of simple physical mixtures, wherefore they do not give rise to the phenomena of demixing, differentiated sedimentation, crystallization of the components, and they do not change their crystalline form when coming into contact with aromatic solvents, even under hot conditions.

Furthermore, the solvent-based pigmentary compositions, such as those used for printing inks, do not cause sedimentation phenomena, not even after long-lasting storage.

The above pigments, either in the highly hiding form or in the transparent form, exhibit excellent pigmentary characteristics, are insoluble in the common organic and aqueous solvents, exhibit very good stabilities to migration in polyvinyl chloride (PVC), to overpainting in stove alkyd enamels, and to acid or alkaline treatments. Such pigments are endowed with a good photostability and a good tinting strength, and are stable to heat when obtained both in the transparent form and at increasing degrees of hiding.

Thus, they are most preferably utilized in painting products for air and stove enamels, in the pigmentation of plastic materials, such as PVC, polystyrene, polyethyleneterephthalate, etc., and in printing inks, according to conventional application techniques.

The mechanical and/or thermal treatments used in said conventional techniques do not substantially modify the pigmentary characteristics of the composite pigments of this invention.

Said composite pigments exhibit the essential advantage of being composed of an inorganic portion or substrate, which is not very expensive and is capable of imparting excellent pigmentary characteristics, among which, in particular, the desired hiding or transparency degree and the excellent stability to solvents, onto which substrate a silane perylene dye, characterized by high photostability, tinting strength and shade purity, is grafted.

The present invention will now be described still more in detail in the following examples, which are given for illustrative purposes and not by way of limitation.

The parts and percentages, unless otherwise specified, are by weight.

EXAMPLE 1

An autoclave, charged with 7.84 g of 3,4,9,10-perylenetetracarboxylic dianhydride, 10.4 g of γ-aminopropyl-triethoxysilane and 40 g of water, was heated to 200° C. during 8 hours under autogenous pressure.

The reaction mass was discharged and filtered at 60° to 80° C., washed at 50° to 50° C. with neutral water, alkaline water due to KOH at 1%, then again with water to neutrality, and finally with methanol. An intensely red-colored powder was obtained by drying which, on analysis, gave the following results: C=57%; H=42%; N=4.3%; Si=9%.

The powder, subjected to I.R. spectroscopic analysis, exhibited the bands typical of silanol groups ≡Si(OH) around 3500 cm$^{-1}$ and those of the imidic groups

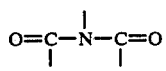

at 1650 cm$^{-1}$ and 1695 cm$^{-1}$, while the bands typical of the anhydride group were absent.

The above analytical and spectroscopic data essentially corresponds to a dye of formula:

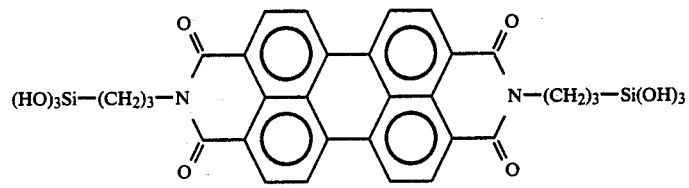

Said dye can also be partially present in oligomeric form by formation of siloxane bonds —Si—O—Si— among the silanol functionalities —Si(OH)$_3$ present in the molecule.

EXAMPLE 2

A closed reactor, charged with 7.84 g of 3,4,9,10-perylenetetracarboxylic dianhydride, 5.23 g of γ-aminopropyltriethoxysilane and 50 g of water, was heated to 200° C. during 8 hours.

After cooling to room temperature, 1.42 g of propylamine were added thereto, and the reactor was heated again to 180° C. during 8 hours.

After cooling to a temperature of 60° to 80° C., the product was discharged, filtered and washed as in Example 1.

An intensely dark red-colored powder was obtained which by drying, on analysis, gave the following results: C=65%; H=4.5%; N=5%; Si=6%.

From the analytical and I.R. spectroscopic data, which revealed the absence of bands of the anhydride group, the presence of ≡SiOH and imide bands, said powder was shown to substantially correspond to a dye of formula:

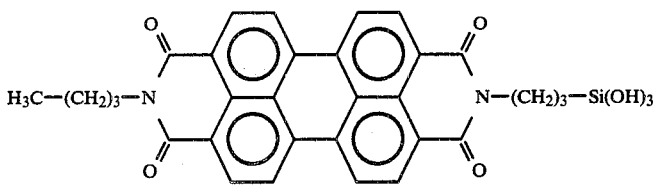

Said dye can also be partially present in the oligomeric form.

EXAMPLE 3

A closed reactor, under a nitrogen atmosphere, charged with 3.92 g of 3,4,9,10-perylenetetracarboxylic dianhydride, 4.98 g of γ-aminopropyltriethoxysilane and 50 g of water, was heated to 180° C. for 10 hours.

After cooling to room temperature, 5.11 g of aniline and 0.5 g of zinc chloride were added, and the reactor was heated again to 220° C. for 12 hours.

After cooling, the product was filtered, hot-washed with water acidified with HCl, then alkaline with KOH (1%) and at last neutral, then with a mixture of water and dimethyl formamide at 50%, then with methanol, and finally dried.

An intensely red-colored powder was obtained which, on analysis, gave the following results: C=67%; H=4%; N=4.5%; Si=4.9%.

From the analytical and I.R. spectroscopic data, said powder was shown to essentially correspond to a dye of formula:

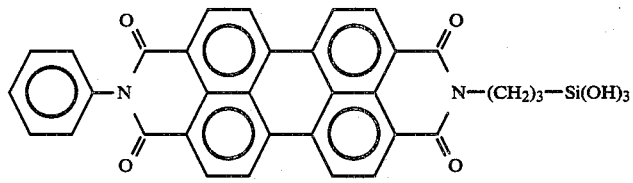

The dye may be partially present in the oligomeric form.

EXAMPLE 4

An autoclave charged, under a nitrogen atmosphere, with 1.806 parts of 3,5-xylidine, as an aqueous solution of the corresponding hydrochloride, 3.92 parts of 3,4,9,10-perylenetetracarboxylic dianhydride, 50 parts of water and 0.5 parts of $ZnCl_2$, was heated to 220° C. during 12 hours.

The resulting product was filtered, hot-washed with water, methanol and dried, then it was reacted again in the autoclave under autogenous pressure, with 3.297 parts of γ-aminopropyl-triethoxysilane, in 50 parts of water, while heating at 220° C. for 12 hours.

The resulting product, separated and dried in like manner as in Example 1, consisted of an intense red powder which, on analysis, gave the following results: C=67.5%; H=4.5%; N=4%; Si=5.5%.

From the analytical data and from the I.R. spectroscopic analysis, the product was shown to essentially correspond to a dye of formula:

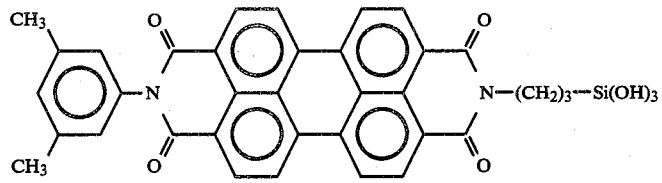

The dye can be partially present in the oligomeric form.

Such dye was also obtained according to a variant of the above procedure, i.e., by first carrying out the reaction between the dianhydride and the γ-aminopropyltriethoxysilane and, successively, the reaction with 3,5-xylidine in the form of the chloride.

EXAMPLE 5

By reacting 3.92 parts of 3,4,9,10-perylenetetracarboxylic dianhydride with 4.98 parts of γ-aminopropyltriethoxysilane, in a first step, and successively with 3.69 parts of para-anisidine in the form of hydrochloride, in water, according to procedures analogous with those described in Example 4, a red product was obtained which, on analysis, gave the following results: C=65%; H=4%; N=4%; Si=5%.

From analytical data and from the I.R. spectroscopic analysis, this product corresponded to:

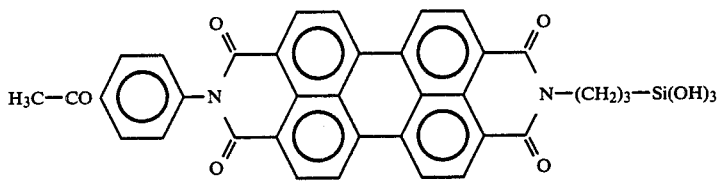

The dye may be partially present in the oligomeric form.

EXAMPLE 6

A silane perylene composite pigment was prepared by using a mixed inorganic substrate of $TiO_2$, $SiO_2$ and $Al_2O_3$, prepared as follows: 100 parts of $TiO_2$ were dispersed, under mechanical stirring, in 1 liter of water, and the dispersion was then heated to 60° C.

After a 15-minute stirring, 210 ml of a sodium silicate solution (titer: 365.47 parts/l of $SiO_2$) were added, and successively, in 3 hours, 200 ml of an aluminum sulphate solution (titer: 60 parts/l of $Al_2O_3$) were additioned. The addition was stopped when the pH of the slurry reached a value of 6. It was left under stirring for 1 hour, whereafter the product was filtered, washed with water in order to remove the soluble salts, and finally dried at a temperature of 70° C.

The dry product was crushed and then ground in an automatic mortar. A white powder (A) was obtained, the composition thereof being as follows: $TiO_2=43.4\%$; $SiO_2=35.1\%$; $Al_2O_3=7.15\%$; $H_2O=14.35\%$. and having a specific surface, determined on the Sorptometer, of 120 $m^2/g$, an actual specific gravity of 2.74 g/ml, an apparent specific gravity of 0.69 g/cc, a % porosity of 7.45, and a total porosity of 1.06 ml/g.

2 parts of the substrate so obtained and 1 part of the dye obtained in Example 1 were ground during 12 hours under wet condition in xylene, then heated to 140° C. during 4 hours and filtered at room temperature.

The resulting product was then placed into an oven at 110° C. and left there overnight, whereafter it was hot-washed with xylene-dimethylformamide at 50%, methanol, and then dried.

An intense red powder was obtained which, on elemental analysis, consisted of 68% of inorganic components.

Said powder proved to be particularly stable to treatments, even under hot conditions, with organic solvents or with water.

In applications in stove alkyd enamels and in polyvinylchloride, the red powder provided highly hiding red products endowed with an excellent tinting strength, stability to overpainting, to migration and to light, when present both in mass and when diluted with $TiO_2$.

The composite pigment in powder form revealed, on X-ray diffractometric analysis, radiation CuK $\alpha$ 1.5418, to consist of particles having the crystallinity typical of $TiO_2$ rutile, while $SiO_2$, $Al_2O_3$ and the silane perylene coating proved to be amorphous.

EXAMPLE 7

One part of the dye obtained according to Example 1 was introduced into a reactor along with 70 parts of water, 1 part of $TiO_2$ and 2.1 ml of a sodium silicate solution ($SiO_2$ titer: 365.47 parts/liter).

The suspension was heated to 60° C. and, under stirring, it was additioned in 3 hours with 2 ml of an aluminum sulphate solution ($Al_2O_3$ titer: 60 parts/liter), maintained at 60° C. during 1 hour and then cooled down to room temperature.

After filtration, the resulting cake was washed with water until neutral pH, dried in an oven at 110° C. overnight, then repeatedly washed with hot water and finally dried.

An intensely red-colored powder was obtained which, on elemental analysis, proved to consist of 67.5% of inorganic components.

The product exhibited application characteristics of stability, hiding power, tinting strength, as well as diffractometric characteristics similar to those of the product obtained according to Example 6.

EXAMPLE 8

1 part of the dye obtained in Example 1 was introduced into a reactor with 70 parts of water, 4.2 ml of a sodium silicate solution ($SiO_2$ titer: 365.47 parts/l).

The suspension was heated to 60° C. and, under stirring, it was additioned in 3 hours with 4 ml of an aluminum sulphate solution ($Al_2O_3$ titer: 60 parts/l), then it was maintained at 60° C. during 1 hour, whereupon it was cooled to ambient temperature.

After filtration, the resulting cake was washed with water to neutral pH, dried in an oven at 110° C. overnight, then repeatedly washed with hot water and, at last dried.

A red powder was obtained which, on analysis, was found to consist of 68.5% of inorganic components.

The composite pigment was revealed, on X-ray analysis, to consist of amorphous particles.

This powder, employed in stove enamel and in polyvinyl chloride, provided red, fully transparent, products endowed with excellent stability and photostability.

EXAMPLES 9-19

By operating according to the procedures of Examples 6 to 8 and utilizing the silane perylene dyes of Examples 1 to 5, in combination with the inorganic substrates indicated in Table 1 below, 11 red pigments of different shades were prepared with different hiding power and transparency degrees and with stability characteristics similar to those of the products obtained in Examples 6 to 8.

TABLE 1

| Example | Dye of the Example | Inorganic Substrate |
|---|---|---|
| 9 | 1 | $TiO_2$—$SiO_2$ |
| 10 | 1 | $TiO_2$—$Al_2O_3$ |
| 11 | 1 | $SiO_2$ |
| 12 | 1 | $Al_2O_3$ |
| 13 | 2 | $TiO_2$—$SiO_2$—$Al_2O_3$ |
| 14 | 2 | $SiO_2$ |
| 15 | 3 | $SiO_2$ |
| 16 | 3 | $TiO_2$—$SiO_2$ |
| 17 | 3 | $TiO_2$—$SiO_2$—$Al_2O_3$ |
| 18 | 4 | $TiO_2$—$SiO_2$—$Al_2O_3$ |
| 19 | 5 | $TiO_2$—$SiO_2$—$Al_2O_3$ |

EXAMPLE 20

(Application in PVC)

In a rotary-arm mixer there were mixed, at 70° C.:
1.0 part of the pigment obtained according to Example 6 and previously ground;
100 parts of polyvinyl chloride in powder form (PVC);
1.5 parts of calcium stearate acting as a complexing and stabilizing agent;
3.0 parts of epoxidized soybean oil;
0.5 parts of lubricant (a mixture of glycerides from $C_{16}$ to $C_{36}$); and
2.0 parts of $TiO_2$.

The mixture thus obtained was then treated at 180° C. in a three-roll refiner until complete dispersion of the pigment in order to obtain a highly hiding red sheet endowed with a good color intensity, a good photostability, a good tinting strength, a good stability to heat, and an excellent stability to migration.

EXAMPLE 21

(Application in Enamel)

5.0 parts of the pigment obtained according to Example 6 were mixed by grinding with 95.0 parts of a fluid carrier having the following composition:
22% of alkyd resin;
19% of melamine resin; and
59% of xylene.

Homogenization was carried out in a ball mill by grinding the mixture in the presence of porcelain spheres of 10 mm diameter, during 24 hours.

The enamel so obtained was applied onto the surface to be painted, allowed to dry overnight, and then it was placed in an oven and left there for 30 minutes at 120° to 125° C.

A red paint having excellent hiding power, stability to sunlight and to overpainting, and a good tinting strength was obtained.

In order to obtain a paint exhibiting a lighter shade and a higher hiding power, 1 part of the enamel, obtained as described above, was further diluted with 9 parts of a white synthetic stove enamel (10% of $TiO_2$) having the following composition:
30% of alkyd resin;
27% of melamine resin;
33% of xylene; and
10% of $TiO_2$.

Homogenization was carried out in a ball mill by grinding the mixture in the presence of porcelain spheres of 10 mm diameter, during 24 hours.

The cut enamel so obtained was applied onto the surface to be painted and allowed to dry overnight, whereafter it was placed in an oven and kept there at 120° to 125° C. during 30 minutes.

A light red paint was obtained, which exhibited excellent general stabilities and a high hiding power.

EXAMPLE 23

(Application in Polystyrene)

0.04 g of the pigment, prepared according to Example 6 and previously ground, were added to 100 g of polystyrene (EDISTIR NA, a Montedison registered trademark) previously dried, and then calendered at 160° C. for 5 minutes.

The dyed material was cut and then crushed in a geared apparatus.

To evaluate the shade, tinting strength and thermostability, moldings were carried out in a CARVER press at 200° C. and at 260° C.

A molded article exhibiting a hiding red shade and characterized by a good thermostability and a good photostability was thus obtained.

What is claimed is:

1. A silane composite pigment consisting essentially of a heterocyclic compound having at most one silane group and having the formula:

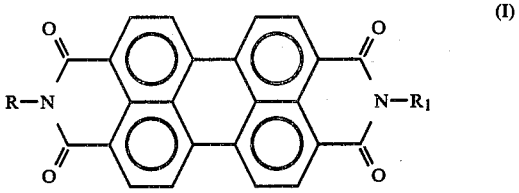

in which R is the residue of a silane group of formula:

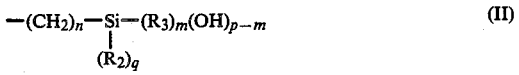

wherein n is 3, 4 or 5; q is 0 or 1; p and m are integers, such that when q is 0, p is 3 and m is 0, 1, 2 or 3, and when q is 1, p is 2 and m is 0, 1 or 2; $R_2$ is an alkyl having up to 4 carbon atoms or a phenyl; $R_3$ is an alkoxyl having up to 2 carbon atoms; $R_1$ may be the same as R or may be an alkyl having up to 6 carbon atoms; a cycloalkyl, a phenyl optionally substituted by one or more halogens or alkyl or alkoxyl groups containing up to 6 carbon atoms, grafted onto a solid inorganic support.

2. A silane composite pigment according to claim 1, in which the inorganic support is selected from amongst $TiO_2$ in the gel, semicrystalline, rutile or anatase form, mixtures of $TiO_2$ with $SiO_2$ and/or $Al_2O_3$, $SiO_2$ and/or $Al_2O_3$, said support being finely particled and having a specific surface ranging from 5 to 500 $m^2/g$.

3. A silane composite pigment according to claim 1, containing from 10 to 50% by weight of the heterocyclic compound in a grafted form.

4. A process for preparing a silane composite pigment as defined in claim 1, consisting essentially in reacting the inorganic support with a heterocyclic compound of formula (I) in a reaction medium consisting essentially of water and/or inert organic solvents, at a temperature ranging from 20° C. to the reflux temperature of the reaction medium, and in then separating and drying the obtained pigment.

5. A process according to claim 4, in which the reaction is carried out by grinding the heterocyclic compound with the support in the presence of the reaction medium, during 2 to 12 hours.

6. A process according to claim 4, in which the composite pigment obtained is subjected to a dry thermal treatment in an oven during 4 to 8 hours at 80° to 140° C.

* * * * *